United States Patent
Booij et al.

(10) Patent No.: US 12,050,280 B2
(45) Date of Patent: Jul. 30, 2024

(54) POSITION DETERMINATION

(71) Applicant: Sonitor Technologies AS, Oslo (NO)

(72) Inventors: Wilfred Edwin Booij, Oslo (NO); Vincent Martello Kwie Hoe Thio, Oslo (NO)

(73) Assignee: Sonitor Technologies AS, Oslo (NO)

( * ) Notice: Subject to any disclaimer, the term of this patent is extended or adjusted under 35 U.S.C. 154(b) by 231 days.

(21) Appl. No.: 17/639,105

(22) PCT Filed: Aug. 27, 2020

(86) PCT No.: PCT/GB2020/052049
§ 371 (c)(1),
(2) Date: Feb. 28, 2022

(87) PCT Pub. No.: WO2021/038224
PCT Pub. Date: Mar. 4, 2021

(65) Prior Publication Data
US 2022/0299590 A1    Sep. 22, 2022

(30) Foreign Application Priority Data
Aug. 29, 2019    (GB) ..................................... 1912412

(51) Int. Cl.
*G01S 5/14* (2006.01)
*G01S 5/02* (2010.01)
(Continued)

(52) U.S. Cl.
CPC .............. *G01S 5/0246* (2020.05); *G01S 5/14* (2013.01); *G01S 5/30* (2013.01); *G01S 11/10* (2013.01); *G01S 11/14* (2013.01)

(58) Field of Classification Search
CPC . G01S 5/14; G01S 5/0246; G01S 5/30; G01S 11/10; G01S 11/14; G01S 5/02;
(Continued)

(56) References Cited

U.S. PATENT DOCUMENTS

| 6,141,293 A | 10/2000 | Amorai-Moriya et al. |
| 10,459,064 B2 | 10/2019 | Olsen et al. |

(Continued)

FOREIGN PATENT DOCUMENTS

| WO | WO 02/063327 A2 | 8/2002 |
| WO | WO 2013/008169 A1 | 1/2013 |
| WO | WO 2019/038542 A2 | 2/2019 |

OTHER PUBLICATIONS

Relative Range Estimation using SDR for Space Traffic Management; to Z. Bouhanna; (IEEE; Mar. 2018) (Year: 2018).*
(Continued)

*Primary Examiner* — Hirdepal Singh
(74) *Attorney, Agent, or Firm* — Sterne, Kessler, Goldstein & Fox P.L.L.C.

(57) ABSTRACT

In a positioning system, a plurality of transmitter units (2, 3, 4, 5) transmit respective transmitter-specific identification signals at intervals, which are received at a mobile receiver unit (7). A processing system (7; 9) identifies the transmitter unit that transmitted each received identification signal, and, for each signal, determines range data from time of arrival data and determines distance data from Doppler shift information. The range data and distance data are compared to determine range error data. A position estimate for the mobile receiver unit (7) is determined by solving an optimisation problem using range estimates determined for the plurality of transmitter units, weighted in dependence on the range error data.

20 Claims, 5 Drawing Sheets

(51) Int. Cl.
*G01S 5/30* (2006.01)
*G01S 11/10* (2006.01)
*G01S 11/14* (2006.01)

(58) Field of Classification Search
CPC ........ G01S 5/18; G01S 13/765; G01S 19/256; G01S 19/35; H04W 4/40; H04W 4/80
USPC ...................................................... 455/456.1
See application file for complete search history.

(56) References Cited

U.S. PATENT DOCUMENTS

| | | |
|---|---|---|
| 2003/0119525 A1 | 6/2003 | Rajkotia |
| 2014/0113652 A1* | 4/2014 | Maguire ............... G01S 5/0289 455/456.1 |
| 2014/0192622 A1* | 7/2014 | Rowe ........................ G01S 5/18 367/117 |
| 2019/0113966 A1 | 4/2019 | Connellan et al. |
| 2020/0182959 A1* | 6/2020 | Markhovsky ........... G01S 19/05 |
| 2020/0242922 A1* | 7/2020 | Dulberg ................... G01S 5/06 |

OTHER PUBLICATIONS

International Search Report for PCT Application No. PCT/GB2020/052049, mailed Nov. 26, 2020 (4 pages).
Written Opinion for PCT Application No. PCT/GB2020/052049, mailed Nov. 26, 2020 (7 pages).

\* cited by examiner

POSITION DETERMINATION

BACKGROUND OF THE INVENTION

This invention relates to systems and methods for determining the position of a mobile receiver unit.

It is known to use signals, such as ultrasonic signals, to determine the position of mobile units, or tags, in two or three dimensions by transmitting signals from a plurality of transmitter units (e.g. fixed to the walls or ceilings of a building). The signals encode identifiers of the respective transmitters units. These signals are received by the mobile receiver units, which may be attached to objects such as people or equipment. If the positions of the static transmitter units are known, the times of arrival of signals from the transmitter units at a mobile unit can be used to estimate the position of that mobile unit in the environment, based on geometric principles such as the intersection of circles or spheres.

In WO 2019/038542 the applicant has disclosed a positioning system in which a plurality of static transmitter units transmit respective phase-modulated ultrasonic signatures based on Complementary-Code-Keying (CCK) codes. Each signature is specific to a respective transmitter unit. The signatures are received by a mobile receiver unit and their times of arrival are used to determine the position of the receiver unit through a geometric multilateration process. In order to determine an accurate decoding of the received signature and arrival time of the signature, the receiver unit cross-correlates received signals with template data after a phase adjustment process, which aims to compensate for any motion-induced phase shift in the received signals.

While this can result in good positioning accuracy, the applicant has now developed approaches that have the potential to provide still greater positioning accuracy.

SUMMARY OF THE INVENTION

From a first aspect, the invention provides a method of determining a position of a mobile receiver unit, the method comprising:
transmitting transmitter-specific identification signals at intervals from a plurality of transmitter units;
receiving the transmitter-specific identification signals at a mobile receiver unit;
processing each of the received identification signals to identify the transmitter unit that transmitted the respective identification signal;
for each transmitter unit:
determining a time of arrival of each of a plurality of the identification signals received by the mobile receiver unit from the transmitter unit during a time window;
processing the times of arrival to determine range data representative of a plurality of distances between the transmitter unit and the mobile receiver unit at intervals during the time window;
determining Doppler-shift information from the plurality of received identification signals;
using the Doppler-shift information to determine velocity data representative of one or more values of a component of velocity of the mobile receiver unit during the time window;
performing an integration operation on the velocity data to determine distance data representative of one or more values of a component of distance travelled by the mobile receiver unit over one or more intervals during the time window;
performing a comparison operation on the range data and the distance data to determine range error data for the transmitter unit; and
using the range data to determine a range estimate representative of a distance between the transmitter unit and the mobile receiver unit, and
determining a position estimate for the mobile receiver unit by solving an optimisation problem using the range estimates determined for the plurality of transmitter units, wherein the optimisation problem weights the range estimate for each transmitter unit in dependence on the range error data determined for the respective transmitter unit.

From a second aspect, the invention provides a system for determining a position of a mobile receiver unit, the system comprising:
a plurality of transmitter units, each configured to transmit respective transmitter-specific identification signals at intervals;
a mobile receiver unit configured to receive the transmitter-specific identification signals; and
a processing system configured to identify the transmitter unit that transmitted each received identification signal, and configured, for each transmitter unit, to:
determine a time of arrival of each of a plurality of the identification signals received by the mobile receiver unit from the transmitter unit during a time window;
process the times of arrival to determine range data representative of a plurality of distances between the transmitter unit and the mobile receiver unit at intervals during the time window;
determine Doppler-shift information from the plurality of received identification signals;
use the Doppler-shift information to determine velocity data representative of one or more values of a component of velocity of the mobile receiver unit during the time window;
perform an integration operation on the velocity data to determine distance data representative of one or more values of a component of distance travelled by the mobile receiver unit over one or more intervals during the time window;
perform a comparison operation on the range data and the distance data to determine range error data for the transmitter unit; and
use the range data to determine a range estimate representative of a distance between the transmitter unit and the mobile receiver unit,
wherein the processing system is further configured to determine a position estimate for the mobile receiver unit by solving an optimisation problem using the range estimates determined for the plurality of transmitter units, wherein the range estimate for each transmitter unit is weighted in the optimisation problem in dependence on the range error data determined for the respective transmitter unit.

From a third aspect, the invention provides a processing system for a positioning system comprising a mobile receiver unit and a plurality of transmitter units, each configured to transmit respective transmitter-specific identification signals at intervals, wherein the processing system is configured to identify the transmitter unit that transmitted each received identification signal, and is configured, for each of the plurality of transmitter units, to:

determine a time of arrival of each of a plurality of the identification signals received by the mobile receiver unit from the transmitter unit during a time window;

process the times of arrival to determine range data representative of a plurality of distances between the transmitter unit and the mobile receiver unit at intervals during the time window;

determine Doppler-shift information from the plurality of received identification signals;

use the Doppler-shift information to determine velocity data representative of one or more values of a component of velocity of the mobile receiver unit during the time window;

perform an integration operation on the velocity data to determine distance data representative of one or more values of a component of distance travelled by the mobile receiver unit over one or more intervals during the time window;

perform a comparison operation on the range data and the distance data to determine range error data for the transmitter unit; and use the range data to determine a range estimate representative of a distance between the transmitter unit and the mobile receiver unit, and wherein the processing system is further configured to determine a position estimate for the mobile receiver unit by solving an optimisation problem using the range estimates determined for the plurality of transmitter units, wherein the range estimate for each transmitter unit is weighted in the optimisation problem in dependence on the range error data determined for the respective transmitter unit.

Thus it will be seen that, in accordance with the invention, the contribution of each transmitter's signals to an overall position calculation can be weighted based on the degree of agreement between timing-based range measurements and frequency-based distance measurements for that transmitter unit. Range estimates for transmitter units that exhibit a higher correlation between these two sources of distance information can be given greater weight in the optimisation problem, while range estimates for transmitter units that exhibit lower correlation can be given less weight. It has been found that, in practice, when the mobile device is in motion, there is typically greater consistency between the time-of-flight range data and the Doppler-shift distances when these are obtained from signals that have travelled along a clear line-of-sight signal path between a transmitter unit and the mobile receiver unit, and there is less consistency where the identification signals have been reached the mobile receiver unit indirectly, after being reflected off, or diffracted by, one or more objects in the environment. When signals arrive along multiple paths and overlap, each path typically has a distinct Doppler shift, due to having a different effective angle between the arrival path and the velocity vector of the mobile device. Thus, weighting contributions based on the associated range error data as disclosed herein can effectively filter spurious signals arising due to reflections, which might otherwise impair the accuracy of the position determination.

The transmitter-specific identification signals may be electromagnetic signals—e.g., radio signals or optical signal—but, in a preferred set of embodiments, they are acoustic signals. They may be ultrasonic signals. Ultrasonic signals are acoustic signals having a frequency higher than the normal human hearing range; typically this means signals having a frequency greater than 20 kHz, e.g. between 30 and 100 kHz.

Acoustic signals are particularly well suited to use in positioning systems, especially indoors, because they travel much slower than radio waves and light waves. Embodiments using acoustic signals may therefore require less accurate time measurements for a given spatial resolution, compared with those using speed-of-light signals.

The position of the mobile receiver may be determined within an environment which may be an indoors environment, although this is not essential. It may, for example, comprise one or more buildings, such as a shopping mall, hospital, warehouse, office complex, domestic residence, etc.

The identification signals may be encoded at a carrier frequency using frequency and/or phase modulation—e.g. as identification data encoded using continuous-phase frequency-shift-keying (CP-FSK), or quadrature phase-shift-keying (QPSK). The identification signals may be contained in packets with variable data payloads, or they may be transmitted as transmitter signatures without any message data. Although the transmitter-specific identification signal of a particular transmitter unit could vary over time, it is preferably constant; this can simplify the decoding. All the identifications signals preferably are preferably the same length across all the transmitter units; again, this can simplify the detection and decoding. Each transmitter unit preferably transmits its identification signals at regular intervals—e.g. every one second.

The processing system may identify the transmitter unit by decoding each received identification signal using an appropriate decoding. In some embodiments, non-coherent correlation-based decoding is used; this can provide good robustness to Doppler shift.

The mobile receiver unit may be in motion during the time window, although it is not essential that the mobile receiver unit be constantly in motion. The time window may have a predetermined duration, which may be between three and twenty times a fixed transmission interval of one or all of the transmitter units. It may be around four times the transmission interval—e.g. approximately four seconds, when using a one-second transmission interval. Position estimates may be determined repeatedly, e.g. in order to track the mobile receiver unit over time, by repeating the steps disclosed herein at intervals.

The processing system may have access to information representative of a time of transmission of each of the identification signals. The range data may thus be determined using the times of transmission, e.g. by subtracting each time of arrival from a corresponding estimated or known time of transmission. The speed of the signals (e.g. assumed or measured) may then be used to calculate distance values from the times of flight. In some embodiments, the system may be synchronised using signals carried over wired or wireless (e.g. radio or ultrasound) channels.

The Doppler-shift information may represent the size of a frequency offset in a received identification signal, e.g. compared with a predetermined carrier frequency. It may be determined by correlation with frequency-shifted templates, or by using Fourier analysis, or in any other way.

The velocity data may represent a radial component of velocity, when the identification signals are received along a direct, line-of-sight path.

A respective component of velocity value may be determined from each of the plurality of received identification signals. In some embodiments, a respective velocity-component error value may be determined for each of the velocity-component values. This error value may be determined in dependence on the stability of any Doppler shift over a time period, or on a measure of received signal strength, or on how consistent a sequence of velocity component values is over time for a particular transmitter unit, or on how consistent a velocity component value for a first transmitter unit is with one or more velocity component values determined for one or more other transmitter units, or in any other way.

In some embodiments, the plurality of the identification signals may be filtered to remove anomalous signals. This filtering may comprise comparing range (time-of-flight) information against signal-strength information, for each identification signal. A linear regression operation may be performed between the range information and signal-strength information for all the identification signal received in the time window. A single regression may be applied to identification signals received from all transmitter units during the time window. Outliers that are more than a threshold deviation from the linear regression may be removed.

The velocity data may be integrated over time to estimate a respective distance travelled by the mobile receiver unit over each interval between the identification signals received from a respective transmitter unit in the time window (after optional filtering).

The comparison operation may comprise performing a correlation operation or a regression operation on the range data and the distance data. It may comprise a least-squares regression operation, which may be weighted. It may be a linear regression. It may be weighted to give more weight to data from a newer identification signal than from an older identification signal. In some embodiments, a decoding error may be determined, representative of confidence in the time of arrival of each identification signal, and the regression operation may be weighted to give more weight to a signal having a lower decoding error than to a signal having a higher decoding error.

In some embodiments, the Doppler-based distance data may be added to (or subtracted from, depending on the direction of the integration) one or more values in the range data, in order to generate quasi-static range values. These quasi-static range values may represent range estimates for a common point in time e.g. projected forward to the arrival time ($T1_i$) of the latest-received identification signal from the respective transmitter unit (i). Each range value may be adjusted by adding to it one or more motion-based distances that span the interval between the time of arrival of the signal from which the range value was derived, and the common point in time.

A regression or correlation operation (e.g. linear regression) may be performed comparing the quasi-static range values against the times of arrival of the corresponding identification signals from which each is generated. It may be a linear regression which may be constrained to be horizontal. The regression or correlation operation may be used to determine the range error data, which may, for example, equal or depend on the root-mean-square deviation of a linear regression, or on any appropriate correlation coefficient or deviation measure. The regression or correlation operation may also be used to output a quasi-static range estimate, for the respective transmitter unit, corresponding to the arrival time of the latest-received identification signal across all of the transmitter units (t=0). This quasi-static range estimate may be adjusted, using the velocity data, for estimated motion during any non-zero time interval there may be between the arrival time ($T1_i$) of latest-received identification signal from the respective transmitter unit, and the arrival time of the latest-received identification signal across all of the transmitter units (t=0). The quasi-static range estimate (after any such adjusting) may be the range estimate that is input to the optimisation problem. Alternatively, the range estimate for the optimisation problem could simply be one of the range values from the range data—e.g. the latest available range value.

The optimisation problem for determining the position estimate may be a least-squares problem, which may be weighted. It may be a linear regression problem. It may be solved using a regression analysis, such as a weighted least-squares method. It may be solved using the Newton-Raphson method or a quasi-Newton method. The optimisation problem may use the locations of the transmitter units, which may be known or determined in advance. The transmitter units are preferably static—e.g. fastened to a surface of a building—although this is not essential. The optimisation problem may comprise a cost function; it may be a minimisation problem. It may receive as input a range estimate for each transmitter unit, calculated from the identification signals received from the respective transmitter unit during the time window. The optimisation problem may be formulated on an assumption that all the range estimates are for straight-line distances (rather than, for example, modelling reflections off surfaces). It may receive as input a range error value for each transmitter unit, calculated from the identification signals received from the respective transmitter unit during the time window.

The optimisation problem may weight range estimates in dependence on any one or more of: age (e.g. favouring newer range estimates), signal strength (e.g. favouring range estimates generated using range data obtained from stronger identification signals), and associated range error values (e.g. favouring ranges estimates generated using time-of-flight range data that is more strongly consistent with the corresponding Doppler-derived distance data). It may use only one range estimate for each transmitter unit, or it may use a plurality of range estimates for each transmitter unit obtained over respective time intervals. When weighting on age, it may give an older range estimate lower weight (e.g. if no more recent range estimate is available for a particular transmitter unit), or it may weight range estimates based on the age of the latest range value from which they were calculated.

The position estimate may be determined in one dimension, two dimensions or three dimensions. The position estimate may be stored or output or processed further. It may be input to a Kalman filter.

References to distances and ranges may be line-of-sight distances, or may refer to total path lengths in situations where this is reflection or diffraction.

The velocity data representative of one or more values of a component of velocity of the mobile receiver unit, from the plurality of transmitter units, may be processed (e.g. combined) to determine a velocity vector for the mobile receiver unit in one, two or three dimensions—e.g. by calculating a resultant vector from two or more component vectors. In some embodiments, an associated velocity vector error value may also be determined.

A velocity vector for the mobile receiver unit may be determined by solving a velocity optimisation problem using the velocity component values (which may be determined from signals from different respective transmitter units). The velocity optimisation problem may comprise a cost function; it may be a minimisation problem. It may receive as input velocity-component values determined from the identification signals received from one or more respective transmitter unit during the time window. The optimisation problem may also receive as input an associated velocity error value for some or all of the velocity values.

The velocity optimisation problem may weight velocity-component values in dependence on any one or more of: age (e.g. favouring newer velocity values), signal strength (e.g. favouring velocity values generated using data obtained from stronger signals), and associated velocity-component error values (e.g. favouring velocity values with lower associated velocity error values). It may use only one velocity value relative to each transmitter unit, or it may use a plurality of velocity values relative to each transmitter unit, e.g. obtained over a plurality of respective time intervals. When weighting on age, it may give an older velocity value a lower weight than a newer velocity value.

The determined velocity vector for the mobile receiver unit may be output graphically on a display, optionally along with the position estimate (e.g. as an arrow associated with an icon representing the mobile receiver unit on a map). It may be displayed as an icon on a map of an environment.

The determined velocity vector may be input to a Kalman filter.

One or more velocity-component values (and optionally associated velocity-component error values) may be processed to determine a heading vector for the mobile receiver device. The heading vector may be representative of a direction of travel of the mobile receiver unit. It may be dimensionless—e.g. being a unit vector, although it may have a magnitude which may be representative of a speed of the mobile receiver unit, and in some embodiments, the heading vector may be a velocity vector. It may be determined in three dimensions or in two dimensions. It may be a two-dimensional vector that is determined from three-dimensional velocity-component vectors. It may be a two-dimensional vector determined in the horizontal plane (i.e. orthogonal to gravity). One or more 3D velocity-component values, or a resultant 3D velocity vector, may be decomposed in the horizontal plane to determine a horizontal planar velocity vector, which may be normalised to determine a planar heading vector. In some embodiments, an associated heading-vector error may also be determined.

In some embodiments, a dimensionless heading vector may be determined by processing a resultant velocity vector. In other embodiments, a heading vector may be determined by processing a plurality of component velocity values determined from a plurality of received identification signals, e.g. by generating a plurality of values of respective components of heading and solving a heading optimisation problem to determine a resultant heading vector.

The heading optimisation problem may comprise a cost function; it may be a minimisation problem. It may receive as input heading values determined by processing the velocity-component values (which may be determined from signals from different respective transmitter units, during the time window). The optimisation problem may also receive as input a heading error value for each of the heading values. The optimisation problem may weight heading values in dependence on any one or more of: age (e.g. favouring newer heading values), signal strength (e.g. favouring heading values generated using velocity values obtained from stronger Doppler signals), and associated heading error values (e.g. favouring heading values with lower associated heading error values). It may use only one heading value determined using velocity data relative to each transmitter unit, or it may use a plurality of heading values determined using velocity data relative to each transmitter unit obtained over respective time intervals. When weighting on age, it may give an older heading value lower weight.

In some embodiments, the mobile receiver unit comprises additional sensing means, such as an accelerometer, a gyroscope, or a magnetometer. In such embodiments, the vector or heading optimisation problem may take, as an additional input, one or more heading values determined using the additional sensing means. For example the optimisation problem may take as an input a heading value and an associated heading error value determined using a gyroscope of the mobile receiver unit and/or a magnetometer of the mobile receiver unit.

A determined heading (or velocity) vector may be represented graphically on a display, optionally along with the position estimate—e.g. as an icon on a map.

In some embodiments, a determined heading for the mobile receiver unit may be displayed as an arc centred on an icon representing a position of mobile receiver unit on a map. The orientation of the arc relative to the display may represent the heading of the mobile receiver unit in the environment. An error in the heading vector may also be represented graphically on the display, and in some embodiments may be represented by the length of the arc. A short arc may represent a heading vector with a relatively low associated heading error, while a long arc may represent a relatively high associated error. For heading estimates with heading errors greater than a certain threshold, a full circle may be displayed instead of an arc to represent a high degree of uncertainty in the determined heading vector.

Any of these approaches may be used to represent a velocity vector for the mobile receiver unit graphically on a display, by also displaying an indication of speed, which may be done in any appropriate way, e.g. by varying a radial thickness of the arc depending on a scalar speed of the velocity vector.

The processing system may comprise processing circuitry and/or one or more processors and memory storing software for execution by the one or more processors. The processing circuitry and/or software may implement any of the features disclosed herein.

The mobile receiver unit may comprise some or all of the processing system. This may be particularly appropriate when the mobile receiver unit has a display screen and powerful processor, for instance if it is a smartphone. In such embodiments, the mobile receiver unit may be arranged to calculate and store its own position estimate. This may avoid the need to communicate data from the mobile receiver unit to be processed elsewhere—e.g., on a remote server.

However, in one set of embodiments one or more of the transmitter units may comprise some or all of the processing system. In another set of embodiments, some or all of the processing system may be external to both the mobile receiver unit and the transmitter units—e.g. on one or more external servers. This may be advantageous in reducing the processing requirement on the mobile receiver unit, which can reduce its cost and power consumption, even after accounting for the need to transmit data from the mobile receiver unit (e.g., by radio). This is especially useful when the mobile receiver unit is battery powered. The processing system may be split across multiple processors or multiple locations, or both. The mobile receiver unit may be configured to transmit the received signal, or information derived therefrom, to a remote processing unit. The mobile receiver unit and/or a transmitter unit may comprise a wired or wireless transmitter, such as a radio transmitter, for transmitting information relating to a received or transmitted signal.

In other embodiments, the mobile receiver unit may comprise only some parts, or even none, of the processing system—e.g., comprising a sampler for sampling the received signals—while other parts of the processing system—e.g., elements configured to use a time of arrival and decoded transmitter-unit identifier to determine the position of the mobile receiver unit—may reside in one or more other units, such as on a remote computer or server. The mobile receiver unit may comprise a radio, optical, or other transmitter—e.g., a Bluetooth, WiFi or cellular network transmitter. It may use the transmitter to transmit data relating to the received signals to a remote processing unit; this could be as an analogue sound file, or digital samples, or processed data.

Each transmitter unit may comprise a radio antenna, light-emitting element, acoustic transducer, or other appropriate means of transmitting the identification signals. It may comprise appropriate circuitry for driving or controlling the transmission, such as a DAC, an amplifier, etc. In a preferred set of embodiments, each transmitter unit comprises at least one ultrasound transducer for generating ultrasonic signals.

The mobile receiver unit may comprise a radio antenna, light-receiving element, acoustic microphone, or other appropriate means of receiving the identification signals. It may comprise appropriate circuitry for controlling the reception, such as an amplifier, an ADC, etc. In a preferred set of embodiments, the mobile receiver comprises at least one ultrasound transducer for receiving ultrasonic signals.

The processing system and/or each transmitter unit and/or the mobile receiver unit may comprise any one or more of processors, DSPs, ASICs, FPGAs for carrying out the described steps. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

The processing system preferably further comprises data storage and/or a display and/or a data connection, and is arranged to store and/or display and/or communicate electronically the information relating to the position of the mobile receiver unit. The system may, for example, be arranged to indicate the position of the mobile receiver unit on a map or plan of a building or the environment.

The system may comprise a radio transmitter arranged to transmit timing information to the transmitter units and/or the mobile receiver unit. The transmitter units and mobile receiver unit may be synchronised so that time of arrival information can be used for positioning, instead of time difference of arrival. This can require fewer transmitter units to be in range and can be more accurate.

In some embodiments, the mobile receiver unit comprises a processor and a display. It may be a mobile telephone (cellphone) or smartphone or tablet or other portable computing device. Alternatively, it may be an asset tag without any complex graphical user interface.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
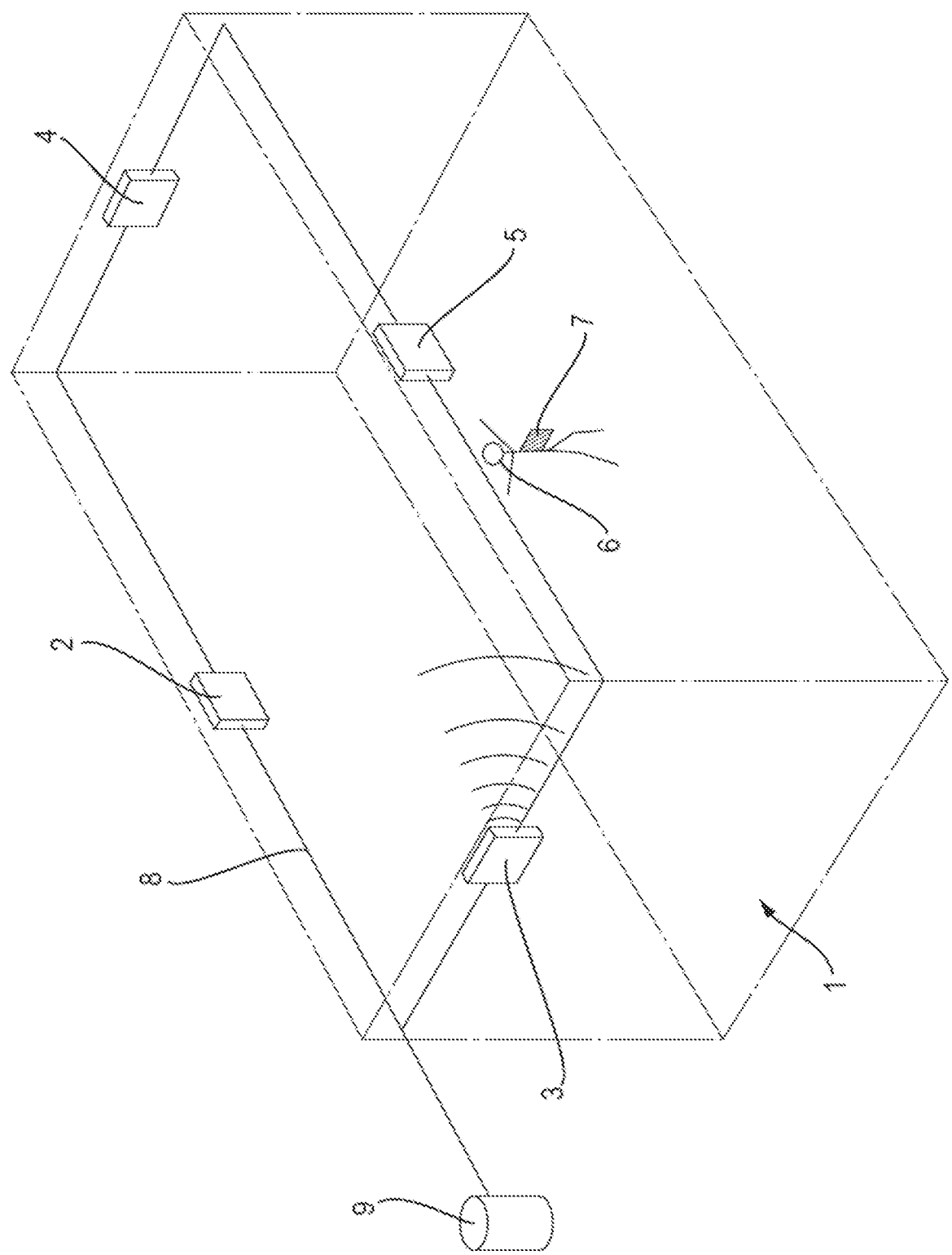
FIG. 1 is a perspective diagram of a positioning system embodying the invention.

FIG. 1 shows part of a positioning system that may be used in, for example, a shopping mall in order to determine the locations of shoppers within the shopping mall. Of course, this is just one example environment, and the positioning system could also be used in warehouses, hospitals, domestic homes, vehicles, etc.

FIG. 1 shows a room 1, to the walls of which are affixed four static transmitter units 2, 3, 4, 5. A person 6 in the room is carrying a mobile receiver unit 7. A network cable 8 connects each transmitter unit 2, 3, 4, 5 to a server 9, which is typically located in another room or in another building. These components cooperate to provide a positioning system, capable of estimating the three-dimensional location of the mobile receiver unit 7 within the room 1. In practice, the system may have further similar transmitter units, installed throughout a building or series of rooms, and a plurality of similar mobile receiver units attached to, or incorporated into, people, animals, vehicles, robots, stock, equipment, etc.

Figure 2:
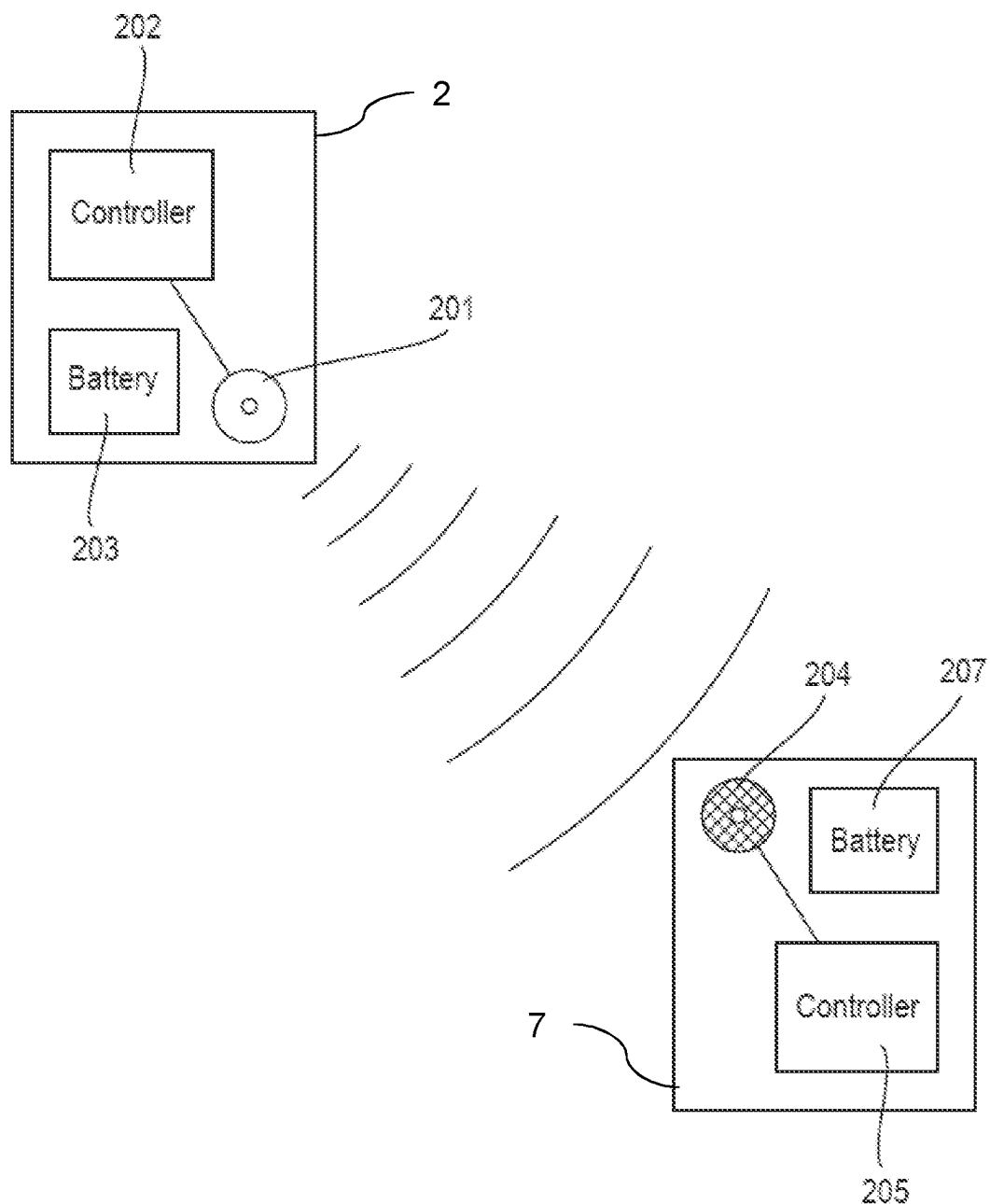
FIG. 2 is a schematic drawing of a static transmitter unit and a mobile receiver unit for use in the positioning system.

FIG. 2 shows a representative one 2 of the transmitter units 2, 3, 4, 5, and a mobile receiver unit 7. The transmitter unit 2 has an ultrasonic sounder 201, a controller 202 for causing the ultrasound transducer 201 to transmit ultrasonic signals, and battery 203 for supplying power to the transmitter unit. The other transmitter units 3, 4, 5 are similarly configured. The mobile receiver unit 7 has a microphone 204 capable of receiving ultrasonic signals from the transmitter units 2, 3, 4, 5, a microcontroller unit (MCU) 205 for sampling and processing the received signals, and a battery 207 for powering the mobile receiver unit 7. The transmitter units 2, 3, 4, 5 and mobile receiver unit 7 may have further standard electronic components such as radio transceivers, wired-network interfaces, display screens, buttons, etc. In some embodiments, the mobile receiver unit 7 is a tablet or mobile telephone (cellphone) such as an Apple™ or Android™ smart phone.

The microcontroller units 202, 205 can include one or more processors, DSPs, ASICs and/or FPGAs. They can include memory for storing data and/or for storing software instructions to be executed by a processor or DSP. They can include any other appropriate analogue or digital components, including oscillators, ADCs, DACs, RAM, flash memory, etc.

Although the transmitter units 2, 3, 4, 5 are here shown as being static relative to the environment 1, it will be appreciated that, in other embodiments, they may be mobile—e.g., one or more of the transmitter units could be a mobile telephone or device in the possession of a respective user.

In use, the server 9 causes each transmitter unit 2, 3, 4, 5 to transmit, at intervals, a signature unique to that transmitter unit (embodying identification data as disclosed herein). It will be understand that, in a large deployment, the signatures may be unique only within a locality; if signatures are reused across a system, additional data is preferably used to differentiate between identical signatures. Each signature is encoded on an ultrasonic carrier—e.g., a 20 kHz or 40 kHz carrier. The signature may be contained in a longer transmission that also has one or more additional elements, such as a preamble and/or data content, preferably also encoded on the same ultrasonic carrier band.

The signature may be encoded using any appropriate frequency-shift or phase-shift encoding. In one set of embodiments, the signature comprises a respective one of a set of sixty-four QPSK-encoded Complementary-Code-Keying (CCK) codes, each CCK consisting of eight complex chips, where each complex chip is encoded as one of four possible QPSK symbols. The signatures may be signatures as disclosed in WO 2019/038542, the entire contents of which are incorporated herein by reference. In another set of embodiments, the signatures are respective binary identifiers encoded using continuous-phase frequency-shift-keying (CP-FSK) modulation.

Each transmitter unit 2-5 transmits its signature at intervals such as once every second. Of course, other rates are also possible. The mobile receiver unit 7 detects and demodulates received ultrasound signals to try to identify signatures that have been transmitted by transmitter units 2, 3, 4, 5 within audible range of the receiver unit 7. For each CCK code that is received and demodulated, an identity of a respective transmitter unit 2, 3, 4, 5 that sent the code can be determined.

Especially in embodiments having a large number of transmitter units, it may be desirable to transmit additional information that allows the mobile receiver unit 7 to distinguish between identical signatures from different transmitter units 2, 3, 4, 5. For example, a short-range RF signal, or additional data encoded in an ultrasound signal transmitted by one or more of the transmitter units 2, 3, 4, 5, can allow signatures to be reused in different locations across a site without ambiguity.

The receiver unit 7 uses an internal clock to timestamp each received signature. The receiver unit 7 may be synchronised with each of the transmitter units 2, 3, 4, 5 (and optionally with the server 9) and can therefore also calculate a time of flight (TOF) for every signature it receives. By combining three or more TOF measurements from known transmitter locations, the position of the mobile receiver unit 7 can be determined using geometric principles of trilateration (also referred to as multilateration). This synchronisation may be carried out using a radio channel, such as a Bluetooth Low Energy™ connection, or in any other suitable way.

In one example, the positioning system has a coarse time resolution of 2 milliseconds which corresponds to a spatial resolution of approximately 68 cm (=0.002 seconds×speed-of-sound in air, 340 m/s). However, using the techniques described below, a much finer temporal resolution can be achieved.

If the receiver unit 7 is not synchronised with the transmitters 2-5, a time difference of flight (TDOF) method can still be used to determine the position of the receiver unit 7; however, in this case, more transmitter units may have to be in range.

The position of the receiver unit 7 may be estimated in three dimensions (e.g., as x, y, z Cartesian coordinates relative to a reference frame of the room 1 or building), or in two dimensions (e.g., on a horizontal plane only), or in one dimension (e.g. as a distance along a corridor). The position determination calculations may be performed on the mobile receiver unit 7, or the receiver unit 7 may send information about the received signals, including timing or distance information, to the server 9, which may perform part or all of the calculations.

Doppler shift occurs whenever the mobile receiver unit 7 is moving towards or away from one or more of the transmitters units 2, 3, 4, 5.

The change in frequency due to Doppler shift is given by $$\Delta f = \frac{v}{c} f,$$

where v is the component of velocity of the mobile receiver unit 7 in a direction towards or away from the transmitter unit 2, 3, 4, 5, c is the velocity of the waves in the air, and f is the frequency of the signal emitted from the transmitter unit. A positive v represents movement of the mobile receiver unit 7 towards a transmitter unit 2, 3, 4, 5.

The relatively low value of speed of sound in air (approximately 340 m/s) causes even low speed movements to create relatively large frequency shifts in the transmitted signal. As an example, if the person 6 carrying the mobile receiver unit 7 walks at a speed of 1.5 metres per second towards one of the transmitter units 2, 3, 4, 5, an acoustic signal at 20 kHz will experience a frequency rise of around 90 Hz.

Since Doppler shift can significantly affect the phase and frequency of the received signals, the mobile receiver unit 7 cannot easily use coherent detection methods. Instead, asynchronous detection methods are used.

The system may use a Doppler-shift compensation mechanism to improve the accuracy of decoding transmitted signatures—e.g. as disclosed in WO 2019/038542 when using CCK codes. Measures of Doppler shift are also used to determine information about the velocity of the mobile receiver unit 7 (e.g. whether it is moving towards or away from a given transmitter and at what radial speed) in order to improve the position estimation, or tracking, of the receiver unit 7 by the server 9 or mobile receiver unit 7, as described in more detail below.

Although processing steps are, for simplicity, described herein as being carried out by the receiver unit 7, it should be understood that, in some embodiments, these steps may instead be carried out wholly or partially by the server 9, where appropriate. Intermediate results may be communicated between the receiver unit 7 and the server 9 by any appropriate means, such as via a radio link.

Figure 3:
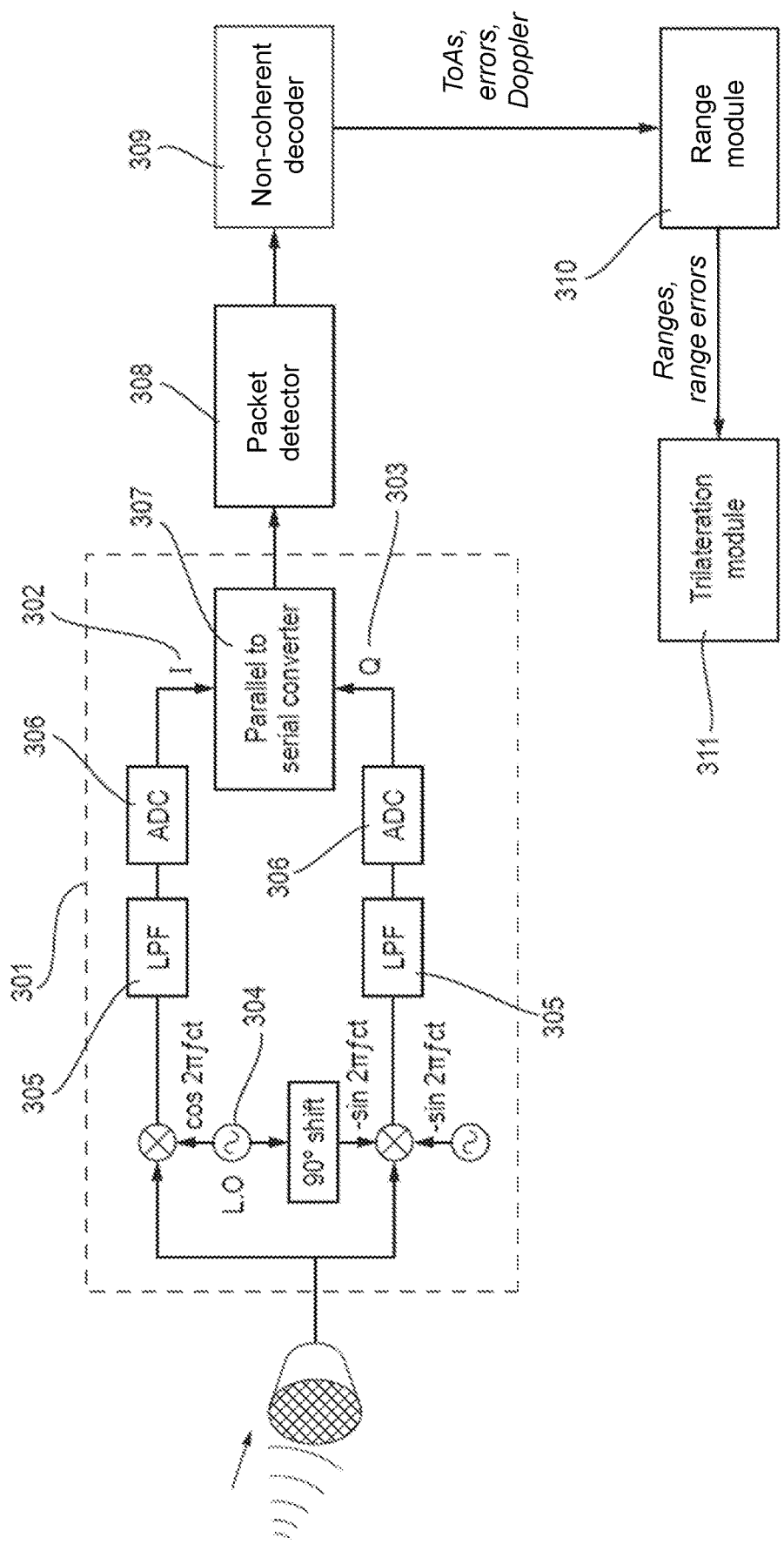
FIG. 3 is a schematic diagram showing functional units in the mobile receiver unit and/or a server.
Figure 4:
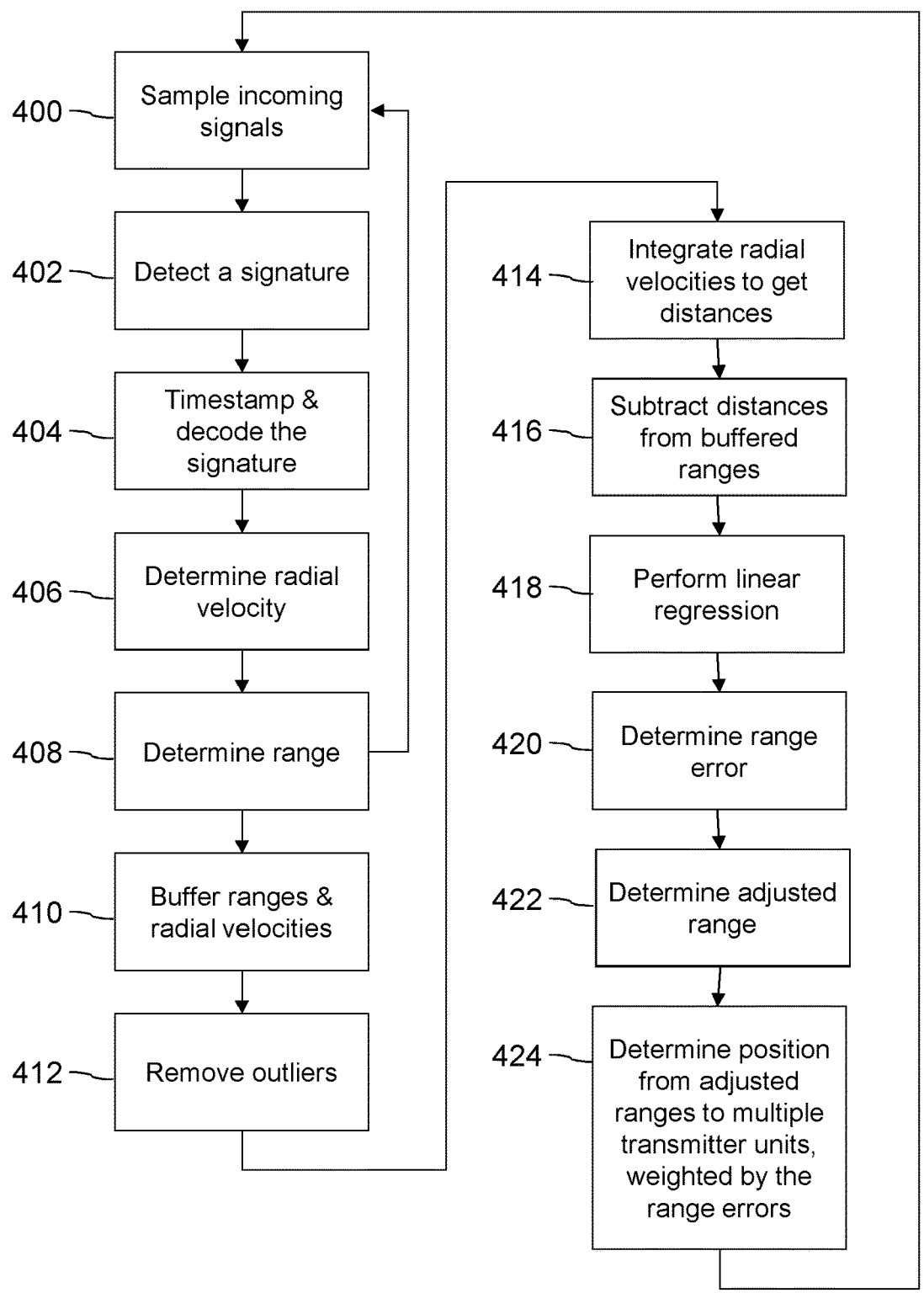
FIG. 4 is a flow chart showing operations carried out by the mobile receiver unit and/or the server.

FIG. 3 illustrates the general structure of the mobile receiver unit 7 while FIG. 4 is a flow chart of key operations carried out by the mobile receiver unit 7. In alternative embodiments, some of the operations may be performed on the server 9.

Overview

Received ultrasound energy is first passed through a quadrature demodulator 301 which down-converts the ultrasound signal to a baseband signal and obtains in-phase (I) 302 and quadrature-phase (Q) 303 samples (step 400). The down-conversion is achieved by frequency-mixing the received ultrasound energy with two copies of a locally-generated 20 kHz signal from a local oscillator 304, one ninety degrees delayed with respect to the other. The two frequency-mixed signals are passed through respective low pass filters 305, which remove the high-frequency components resulting from the mixing operation.

The resulting in-phase 302 and quadrature 303 components are passed through respective analogue to digital converters 306 for sampling (e.g. at 2 kHz). The in-phase and quadrature samples are then combined at 307 to give a sequence of complex IQ data samples.

The complex IQ data samples are fed into a packet detector 308 sample by sample. The packet detector 308 detects where a signature is likely to be present in the received signal (step 402). The packet detector 308 then outputs the relevant samples to a non-coherent decoder 309. The packet detector 308 may also output a coarse time-of-arrival estimate.

The decoder 309 uses a correlator to identify which of a predetermined set of signature templates best matches the received signature, thereby identifying the particular transmitter unit 2, 3, 4, 5 that transmitted the received signal; it may optionally determine a more accurate time-of-arrival estimate for the signature (step 404). It also determines a decoder-derived error value, and an estimate of Doppler shift (optionally along with an error value for the Doppler shift estimate), which it passes to a range module 310 (step 406).

The range module 310 processes the time-of-arrival information and the Doppler shift information to calculate a range estimate for each transmitter unit 2, 3, 4, 5, along with a range error, using novel methods disclosed herein (steps 408-422). The range module 310 passes range estimates and range errors for each transmitter unit 2-5 to a trilateration module 311. The trilateration module uses these values to determine a 1D, 2D or 3D position estimate for the mobile receiver unit 7 in the room by solving a geometric optimisation problem—e.g. a minimisation problem for overspecified spherical or hyperbolic intersections (step 424). The geometric optimisation is weighted using the range errors.

This process is typically carried out continually (as indicated by step 424 looping back to step 400) for as long as the mobile device 7 is to be tracked, to generate a succession of position estimates over time, allowing the mobile receiver unit 7 to be tracked in near real time. The position estimates from the trilateration module 311 may be input to a Kalman filter or other similar module which may provide temporal smoothing or which may combine the position estimates with one or more additional sources of positional data—e.g., from a gyroscope, altimeter, compass, RFID positioning system, etc.

In addition to position estimates, the Doppler-shift information (and optionally associated Doppler-shift error value) may also be used to determine information about the velocity of the mobile receiver unit 7. For a given transmitter unit 2, 3, 4, 5, it can be determined whether the mobile receiver unit 7 is heading towards or away from the transmitter unit 2, 3, 4, 5, and at what estimated radial speed. Once a position estimate for the mobile receiver unit 7 is known, this information enables a component of velocity along a respective direction to be determined from signals from each transmitter unit 2-5. By combining the component velocity information received from multiple transmitter units 2, 3, 4, 5, a net resultant velocity of the mobile receiver unit 7 can be estimated.

Operational Details

The operations of the packet detector 308, decoder 309, range module 310 and trilateration module 311 will now be described in more detail. Each of these modules may be implemented entirely in software, executing on one or more processors in the mobile unit 7 and/or the server 9, or may be implemented in hardware circuitry (e.g. as an ASIC or FPGA), or with a combination of software and hardware.

A packet may consist solely of a transmitter-unit signature, or it may comprise a signature and associated data. The signature may optionally include one or more common elements that are identical across all the transmitter units 2-5, such as a constant preamble. The different signatures are preferably all the same length.

The packet detector 308 detects incoming packets using a shaped window having the same length as the signatures (step 402). This window may be a sliding energy window, such as the window described in WO 2019/038542 for detecting CCK codes, which simply sums the energy levels within the window. Alternatively, the packet detector 308 may cross-correlate the incoming signal with a shaped window and determine the magnitude of the correlation. A packet is detected when the energy or correlation magnitude peaks above a threshold. A coarse time-of-arrival is determined from the location of the peak, using a local clock of the receiver unit 7. For instance, the coarse arrival time may be determined as the point in time where the magnitude of the correlation is at a threshold percentage of the maximum correlator amplitude for the signal detected. The slope of the correlation magnitude at this point may be used to estimate an error in the coarse time of arrival.

The samples corresponding to a detected peak are passed to the non-coherent decoder 309, which decodes the signature (step 404). (The decoder 309 may also decode any optional data.) Exactly how the decoder 309 operates will depend on the encoding scheme used. In some embodiments, it may use a matched filter bank approach to implement maximum-likelihood decoding. It may cross-correlate the received samples against a set of signature templates (e.g., by calculating a dot product) and determine the signature having the highest correlation magnitude, thereby identifying the transmitter unit 2-5 which transmitted the signature. The decoder 309 also determines a decoder-derived error value—e.g. from the slope of the correlator magnitude (output by the packet detector 308) and/or observed noise.

The decoder 309 determines an estimated Doppler frequency-shift for the signature. It may do this by comparing a Fourier transform of the received samples with signature templates for each transmitter unit 2-5 in the frequency domain, or using any of the methods disclosed in WO 2019/038542, or in any other appropriate way. The amount of Doppler shift will depend on the radial velocity component of the mobile unit 7 relative to the transmitter 2-5, assuming the signal arrives along a line-of-sight path. The Doppler shift is used by the decoder 309 to calculate a value of a radial component of velocity of the mobile receiver unit 7 (step 406). By combining respective radial velocity components for the mobile unit 7, determining from signals from multiple transmitter units 2-5, a single resultant velocity vector for the mobile receiver unit 7 can be calculated.

The range module 310 receives a succession of tuples from the decoder 309, each corresponding to a signature identified by the decoder 309. Each tuple comprises at least {a transmitter unit identifier; an arrival time stamp; a decoder error value; a velocity component value}. The time intervals between tuples may be irregular, e.g. due to varying times-of-flight as the mobile unit 7 moves around the environment, or due to changes as to which transmitter units 2-5 are in audible range with a required signal-to-noise ratio.

The range module 310 converts each arrival time stamp to a range, based on a known transmission schedule for the associated transmitter unit 2-5, by determining a time-of-flight and multiplying the time-of-flight with the speed of sound. (This assumes the system is synchronized; if it is not, the range module 310 and trilateration module 311 can instead use time-differences-of-arrival and an ellipsoidal intersection approach to track the mobile unit 7.) The range represents straight-line separation in the case of a line-offlight path, but may be longer if the signal has arrived after one or more reflections in the environment.

The range module 310 maintains a buffer of tuples comprising at least {range measurements, decoder error values, velocity values} received during a rolling time window— e.g. received over the preceding 4 seconds (or between 3 and 15 seconds) (step 410). With a one-second transmission rate for each transmitter unit 2-5, the time window would typically contain four range values from each transmitter unit 2-5, although there may be gaps due to missing or erroneous transmissions. A shorter time window may have reduced latency, but a higher risk of having insufficient data to determine a reliable range value for one or more of the transmitter units. The age of each tuple relative to the time-of-arrival of the latest-received tuple, across all the transmitter units 2-5, is also stored. The timestamp of the latest-received tuple can be seen as defining a time reference t=0, with earlier times-of-arrival being negative time offsets from this timestamp.

The range module 310 determines a new position estimate at regular intervals—e.g. every second, or every four seconds—from the values stored in the buffer. This is done as follows.

First, the tuples in the buffer may optionally be filtered to remove outliers (step 412). This may be done by performing a robust linear regression between the time-of-flight range measurements and the inverse of the square-root of a received signal strength value (RSS) for the signature, which may be output by the packet detector 308—e.g. from the magnitude of a correlator peak. Outliers identified by the regression can be removed. However, the threshold is preferably set high, so that only extreme outliers are excluded.

For each transmitter unit 2-5, i, featured in the buffer, the range module 310 numerically integrates the Doppler-derived velocity values of the signatures from the transmitter unit, i, moving backwards in time from the arrival time, $T1_i$, of the most recent tuple for that transmitter unit, to generate a corresponding set of distance values, each being a respective estimate of the radial component of distance moved by the mobile unit 7 between the time of arrival of a respective tuple for that transmitter unit and $T1_i$ (assuming a line-of-sight path) (step 414). The integration may be performed using Simpson's rule, or any other appropriate technique. As the integration is performed backwards, the direction will have the opposite sign to the corresponding range values.

For each transmitter unit 2-5, the range module 310 then subtracts each Doppler-derived distance component to its corresponding time-of-flight range so as to generate a set of quasi-static range estimates, all adjusted to time $T1_i$ (step 416). If the motion of the mobile device 7 were uniform over the time window and if there were no measurement errors, in theory all the quasi-static range estimates for a particular transmitter unit should be identical, equal to the range of the latest tuple received for that transmitter unit. However, the presence of error terms means that this will not normally be the case in practice.

The range module 310 then performs a respective weighted least-squares linear regression analysis, separately for each transmitter unit 2-5, fitting the quasi-static ranges from that transmitter unit against time (step 418). Any transmitter unit 2-5 which provided fewer than three tuples in the time window is excluded as being insufficiently audible; this is because a linear fit is not possible with only one data point, and because a linear fit cannot be used to determine a (non-trivial) variance measure if there are only two data points. Each quasi-static range is weighted inversely to its corresponding decoder error value (such that less reliable time-of-arrival ranges are given a lower weight), and inversely with age (such that older tuples are given a lower weight). In particular, in some embodiments the range may be weighted in inverse proportion to the variance of the range error (i.e. standard deviation squared), although many variants of the dependency are possible. The time-based weight can be applied linearly, decreasing from one, at t=0, to zero over the duration of the time window into the past (e.g. over the past four seconds). The linear fit may optionally further be constrained to have a slope of zero (i.e. horizontal). This corresponds to there being a perfect fit between the actual range changes and the Doppler-derived velocities, such that any deviation from this behaviour results in a large root-mean-square deviation (or standard deviation).

The range module 310 uses each linear fit to obtain a respective estimate of the quasi-static range at time t=0 for each transmitter unit 2-5 in range. It also determines an estimate of the error in the quasi-static range data for each transmitter unit 2-5, where the transmitter-unit range error equals the root-mean-square deviation of the weighted linear fit for that transmitter unit (step 420). For each transmitter unit except the transmitter unit that transmitted the latest-received signature (whose arrival time defined t=0), the latest signature from that transmitter unit will have an arrival time $T1_i<0$, and so the quasi-static range estimate for t=0 can be improved by using the latest Doppler velocity value for that transmitter unit to project the range estimate forwards in time over the period $t=T1_i$ to t=0. It does this by adding, to the quasi-static range estimate, the velocity multiplied by $-T1_i$, to yield an adjusted range value, for each transmitter unit 2-5 that is in audible range (step 422).

The range module 310 then passes, to the trilateration module 311, an adjusted range value, $R^{qs}_i$, and a range error value, $\sigma_{r\_qs,i}$, calculated as above, for each transmitter unit 2-5, i, that was in audible range over the time window.

The trilateration module 311 knows the positions of the transmitter units 2-5 in the room 1. Preferably, sufficiently many transmitter units 2-5 are installed in the room 1 that the problem of determining a position of the mobile unit 7 will generally be over-specified (i.e. having more transmitter units in audible range than the required number of spatial dimensions); however, the range data is subject to error. The trilateration module 311 therefore inputs the ranges and range errors to a geometric optimisation process, which seeks to minimise a cost function based on the weighted sum of squared residuals (step 424). The gradient is calculated analytically. The optimisation may be solved using a quasi-Newton method.

In particular, the position may be estimated by minimising the cost function:

$$\chi^2(r) = \sum_{i=1}^{N} w_i [r - R^{qs}_i]^2$$

where $$w_i = \frac{wt_i \sqrt{RSS_i}}{\sigma^2_{r\_sys} + \sigma^2_{r\_qs,i}}$$

and where:
r is the distance between transmitter unit i (i=1, ..., N) and the mobile device 7 when the mobile device 7 is in a position {x, y, z}, where x, y, z are the unknowns to be solved for (or {x, y} when tracking in 2D, or just {x} when tracking in 1D);

$R^{qs}_i$ is the adjusted quasi-static range estimate for transmitter unit i, as received from the range module 310;

$wt_i$ is a weight that depends on the age of the observation (e.g. which linearly decreases with time over the duration of the buffer);

$RSS_i$ is a received signal strength value for the latest signature received from transmitter unit i, as determined by the packet detector 308—e.g. from the magnitude of a correlator peak;

$\sigma_{r\_sys}$ is an optional system-specific constant representing a lower standard deviation limit for the range (e.g. 30 centimetres); and $\sigma_{r\_qs,i}$ is the transmitter-unit range error for transmitter unit i, as received from the range module 310.

In this way, the contributions of the respective transmitter units are weighted to favour newer range estimations, and to favour range estimations from stronger signals (which will typically correspond to closer transmitter units), and to favour range estimations for which the motion-based Doppler information has been strongly consistent with the range history over the previous four second time window.

The trilateration module 311 may output a time-series of positions at intervals. These intervals may be regular, or may be irregular if insufficient signatures are received in a particular time window to enable a reliable estimate to be determined.

The quasi-Newton optimisation method requires an initial guess for the position $\{x, y, z\}$. At start-up, this may be calculated as a weighted mean position. Subsequently, the latest position can be used as the guess for the next optimisation cycle. This can be made more efficient by also using an estimated velocity vector to predict the current position of the mobile device 7 based on the latest position and time elapsed since that position was calculated.

The trilateration module 311 may optionally determine an error estimate for each $\{x, y, z\}$ position estimate by calculating the Hessian (partial derivative of the cost function) numerically.

The trilateration module 311 may optionally determine a device velocity vector and its error by projecting the radial velocity components determined for each transmitter unit 2-5 into a Cartesian coordinate system centred on the mobile device 7. This is straightforward if the number of transmitter units 2-5 in range is equal to the dimensionality of the coordinate system (i.e., 1D, 2D or 3D), but it may typically be overdetermined, with more velocity vectors than dimensions. In this case, the trilateration module 311 may calculate a geometric coordinate transformation matrix in which the rows are weighted using the weights, $w_i$, calculated as above in the cost optimisation process. It may then calculate the pseudo-inverse of this matrix, and multiply the latest radial velocity estimates with the inverse matrix to obtain a device velocity vector.

In some embodiments, the decoder 309 may output an error value for each Doppler shift measurement, from which a velocity-component error value may be determined for each component of velocity value. These error values may depend on the reliability of a single frequency-offset estimate determined by the decoder 309 (e.g. being higher if there is a high signal-to-noise ratio, or if the frequency offset is not uniform during the decoding), or may depend on the consistency over a plurality of frequency estimates. In this case, a Cartesian velocity error estimate may be calculated similarly, based on these radial velocity errors, but with all multiplications carried out squared.

In some embodiments, a three-dimensional resultant device velocity vector may be processed to determine a two-dimensional dimensionless heading vector for the mobile receiver unit 7, for example by decomposing the velocity vector in the horizontal plane to determine a planar velocity vector, which is then normalised to a unit length. An associated 2D heading vector error may also be determined, based on an associated 3D velocity error estimate.

In some embodiments, the position estimates (and optionally position error values, and/or velocity or heading vectors, and/or velocity or heading error values) may be input to a Kalman filter module to generate improved position data. The Kalman filter may combine them with other sensor data, such as heading data from a gyroscope or magnetometer.

The positions estimated by the trilateration module 311, and a heading vector for the mobile receiver unit 7 (which may be dimensionless, or which may have a length value), may be stored in a memory and/or further processed and/or output on a display screen or over a network interface. Position data may be used to control one or more functions of the mobile receiver unit 7—e.g. to cause the device 7 to sound an alert when passing a predetermined geo-fence, or to display an advertisement when in proximity of a particular retailer in a shopping mall. It may be used by the server 9 to track the mobile receiver unit 7. The position estimate and the heading vector may be displayed on a display screen of the mobile receiver unit 7, in order to guide a user of the mobile receiver unit 7, as illustrated in FIG. 5.

Figure 5:
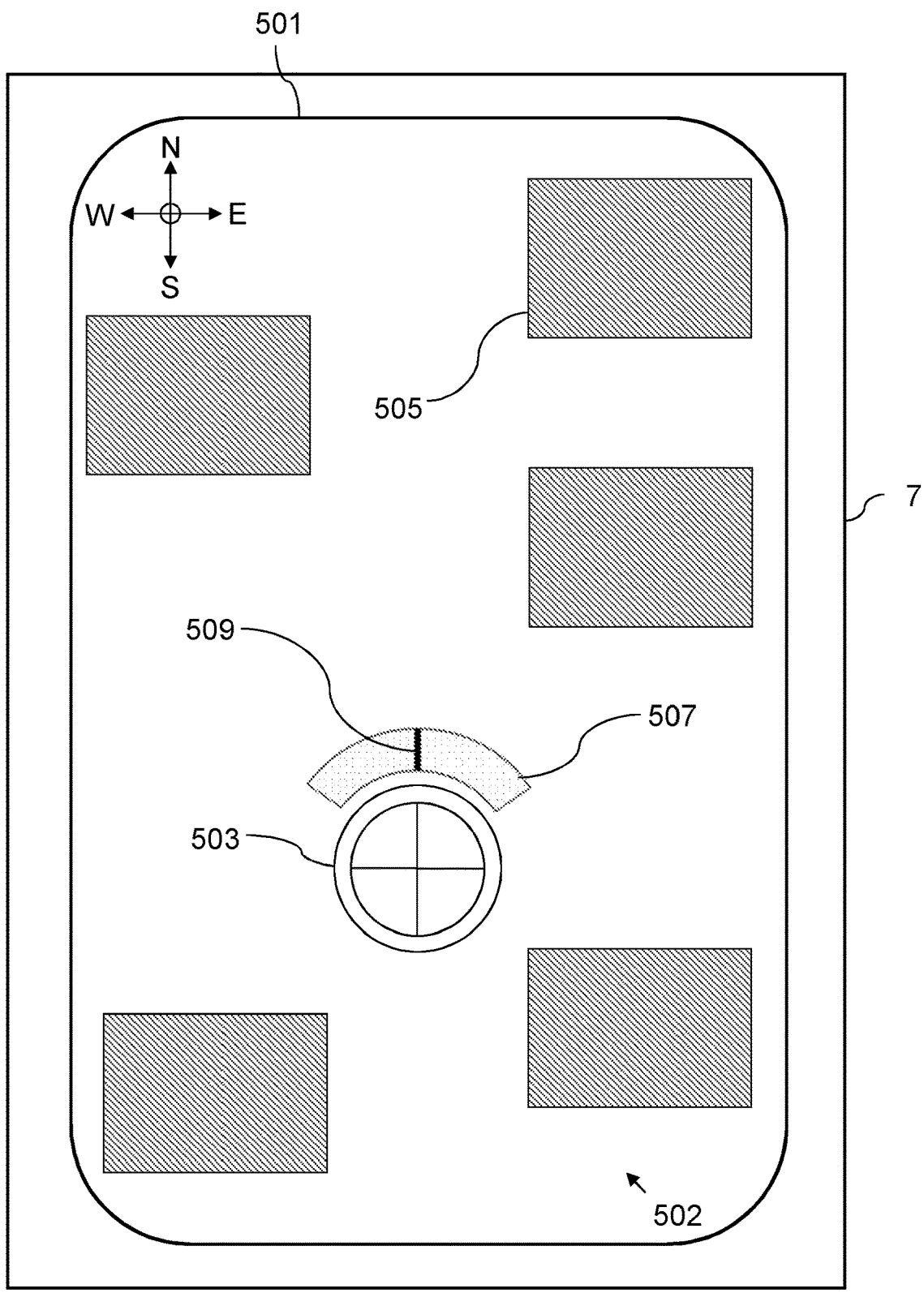
FIG. 5 is a diagram of a display on the mobile receiver unit.

FIG. 5 shows an embodiment of a mobile receiver unit 7 having a display screen 501 and configured to display a position and a heading vector for the mobile receiver unit 7 within an environment. It shows a simulation of the contents of the display 501 while a navigation application is running. The unit 7 may be a smartphone or other personal computing device.

The display 501 shows a full-screen plan-view map 502 of an environment such as a shopping mall. A reticle icon 503 is centred on the position of the mobile receiver unit 7 on the map 502, as determined by the trilateration module. Features on the map 502, including the locations of particular retailers or other points of interest 505, and other map data are stored temporarily or permanently in a memory of the mobile receiver unit 7. When the mobile receiver unit 7 is in motion, its heading is represented on the display 501 in the form of a radial line 509 of fixed width within an annular sector 507 located concentrically about the reticle 503. The orientation of the annular sector 507 and the radial line 509, relative to the map 502, are used to represent the current heading of the mobile receiver unit 7. The line 509 is oriented in the direction of a determined 2D heading vector, while an error value for the heading vector is represented by the variable angle of the annular sector 507: an annular sector of small angle is representative of a low error or uncertainty in the heading vector, while an annular sector of large angle is representative of a high degree of uncertainty in the heading vector. This can communicate the confidence in the heading in an easily-understood fashion. When the heading vector has an associated error greater than a certain threshold, a full 360-degree annulus may be displayed instead of an annular sector to represent the high degree of uncertainty in the heading vector.

As the mobile receiver unit 7 moves within the environment, the position of the reticle 503 on the display 501 moves within the map 502. The annular sector 507 and the radial line 509 rotate around the reticle icon 503 as the user changes direction. In this way, a user of the mobile receiver unit 7 can use the display 502 to navigate easily within the environment, independently of the orientation of the receiver unit 7.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A processing system for use in a positioning system, the positioning system comprising a mobile receiver unit and a plurality of transmitter units, each configured to transmit respective transmitter-specific identification signals at intervals,
wherein the processing system is configured to identify the respective transmitter unit that transmitted each received identification signal,
wherein the processing system is further configured, for each of the plurality of transmitter units, to:
determine a time of arrival of each of a plurality of the identification signals received by the mobile receiver unit from the transmitter unit during a time window;
process the times of arrival to determine range data representative of a plurality of distances between the transmitter unit and the mobile receiver unit at intervals during the time window;
determine Doppler-shift information from the plurality of received identification signals;
use the Doppler-shift information to determine velocity data representative of one or more values of a component of velocity of the mobile receiver unit during the time window;
perform an integration operation on the velocity data to determine distance data representative of one or more values of a component of distance travelled by the mobile receiver unit over one or more intervals during the time window;
perform a comparison operation on the range data and the distance data to determine range error data for the transmitter unit; and
use the range data to determine a range estimate representative of a distance between the transmitter unit and the mobile receiver unit, and
wherein the processing system is further configured to determine a position estimate for the mobile receiver unit by solving an optimisation problem using the range estimates determined for the plurality of transmitter units, wherein the range estimate for each transmitter unit is weighted in the optimisation problem in dependence on the range error data determined for the respective transmitter unit.

2. The processing system of claim 1, wherein the processing system is configured to access information representative of a time of transmission of each of the identification signals, and to use said times of transmission when determining the range data.

3. The processing system of claim 1, configured to determine a respective velocity-component value from each of the plurality of received identification signals.

4. The processing system of claim 3, configured to determine a respective velocity-component error value associated with each of the velocity-component values.

5. The processing system of claim 3, configured to determine a resultant velocity vector for the mobile receiver unit by processing the respective velocity-component values from each of the plurality of received identification signals.

6. The processing system of claim 1, configured to determine a velocity vector for the mobile receiver unit and an associated velocity vector error value by solving an optimisation problem using the one or more velocity-component values, wherein each velocity-component value is weighted in the optimisation problem in dependence on a respective associated velocity-component error value.

7. The processing system of claim 1, configured to determine a heading vector for the mobile receiver unit by processing the velocity data representative of the one or more values of a component of velocity of the mobile receiver unit.

8. The processing system of claim 1, configured to determine a heading vector for the mobile receiver unit by processing the one or more velocity-component values to generate one or more respective heading values, and by solving an optimisation problem using the heading values, wherein each heading value is weighted in the optimisation problem in dependence on a respective associated heading error value.

9. The processing system of claim 8, wherein the mobile receiver unit comprises a gyroscope or a magnetometer; and wherein the optimisation problem takes as an input, in addition to the heading values, a heading value and an associated heading value error determined using the gyroscope or the magnetometer.

10. The processing system of claim 7, wherein the mobile receiver unit comprises a display, and is configured to display a graphical representation of the heading vector on the display.

11. The processing system of claim 1, configured, for each transmitter unit, to filter the plurality of identification signals to remove anomalous signals by comparing the range data against signal-strength information for each identification signal.

12. The processing system of claim 1, wherein the comparison operation, for each transmitter unit, comprises adding one or more distance values from the distance data to one or more range values from the range data to generate quasi-static range values for respective identification signals, the quasi-static range values representing estimated range values for a common point in time, and performing a regression or correlation operation on the quasi-static range values and the times of arrival of the respective identification signals to determine the range error data.

13. The processing system of claim 1, wherein the comparison operation comprises a weighted least-squares regression operation, weighted to give less weight to range values obtained from earlier-received identification signals than to range values obtained from later-received identification signals.

14. The processing system of claim 1, wherein the optimisation problem assumes that all the range estimates are for straight-line distances.

15. A positioning system for determining a position of a mobile receiver unit, the positioning system comprising:
a plurality of transmitter units, each configured to transmit respective transmitter-specific identification signals at intervals;
a mobile receiver unit configured to receive the transmitter-specific identification signals; and
a processing system;
wherein the processing system is configured, for each of the plurality of transmitter units, to:
determine a time of arrival of each of a plurality of the identification signals received by the mobile receiver unit from the transmitter unit during a time window;
process the times of arrival to determine range data representative of a plurality of distances between the transmitter unit and the mobile receiver unit at intervals during the time window;

determine Doppler-shift information from the plurality of received identification signals;

use the Doppler-shift information to determine velocity data representative of one or more values of a component of velocity of the mobile receiver unit during the time window;

perform an integration operation on the velocity data to determine distance data representative of one or more values of a component of distance travelled by the mobile receiver unit over one or more intervals during the time window;

perform a comparison operation on the range data and the distance data to determine range error data for the transmitter unit; and use the range data to determine a range estimate representative of a distance between the transmitter unit and the mobile receiver unit, and wherein the processing system is further configured to determine a position estimate for the mobile receiver unit by solving an optimisation problem using the range estimates determined for the plurality of transmitter units, wherein the range estimate for each transmitter unit is weighted in the optimisation problem in dependence on the range error data determined for the respective transmitter unit.

16. The system of claim 15, wherein the identification signals are acoustic signals encoded using frequency or phase modulation.

17. The system of claim 15, wherein each transmitter unit is configured to transmit the transmitter-specific identification signals at regular intervals, the regular intervals having a common duration across the transmitter units, and wherein the time window is at least three times said common duration.

18. The system of claim 15, wherein the mobile receiver unit comprises some or all of the processing system.

19. The system of claim 15, wherein the mobile receiver unit comprises a processor and a display, and is configured to output information derived from the position estimate on the display.

20. A method of determining a position of a mobile receiver unit, the method comprising:

transmitting transmitter-specific identification signals at intervals from a plurality of transmitter units;

receiving the transmitter-specific identification signals at a mobile receiver unit;

processing each of the received identification signals to identify the transmitter unit that transmitted the respective identification signal;

for each transmitter unit:
  determining a time of arrival of each of a plurality of the identification signals received by the mobile receiver unit from the transmitter unit during a time window;
  processing the times of arrival to determine range data representative of a plurality of distances between the transmitter unit and the mobile receiver unit at intervals during the time window;
  determining Doppler-shift information from the plurality of received identification signals;
  using the Doppler-shift information to determine velocity data representative of one or more values of a component of velocity of the mobile receiver unit during the time window;
  performing an integration operation on the velocity data to determine distance data representative of one or more values of a component of distance travelled by the mobile receiver unit over one or more intervals during the time window;
  performing a comparison operation on the range data and the distance data to determine range error data for the transmitter unit; and
  using the range data to determine a range estimate representative of a distance between the transmitter unit and the mobile receiver unit, and determining a position estimate for the mobile receiver unit by solving an optimisation problem using the range estimates determined for the plurality of transmitter units, wherein the optimisation problem weights the range estimate for each transmitter unit in dependence on the range error data determined for the respective transmitter unit.

* * * * *